Aug. 31, 1937.                A. LICHTE                    2,091,370
                       INTERNAL COMBUSTION ENGINE
                         Filed Jan. 29, 1936         2 Sheets-Sheet 1
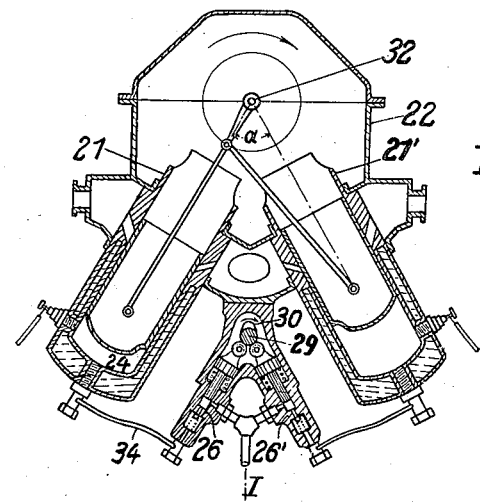
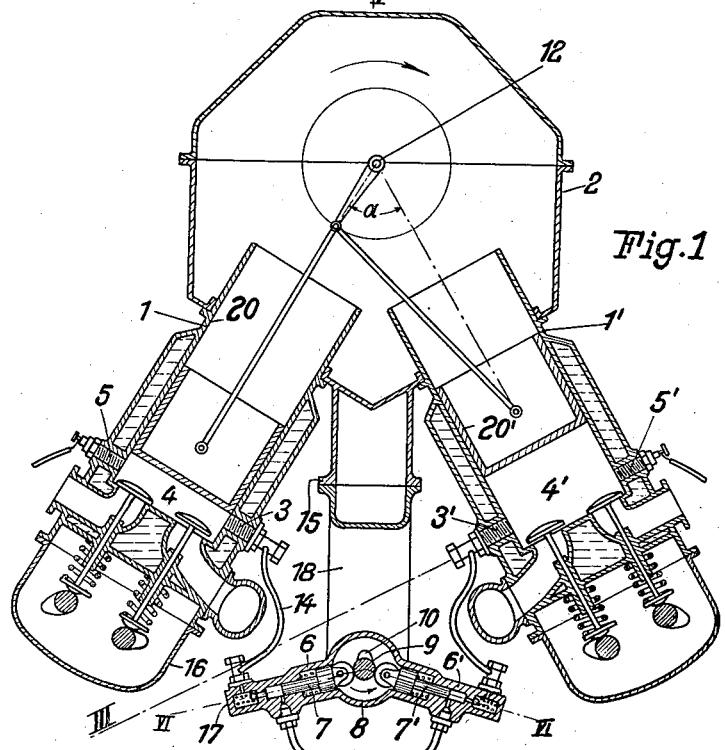
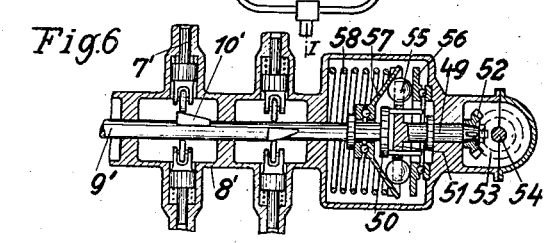
Inventor:
August Lichte Aug. 31, 1937.                    A. LICHTE                      2,091,370
                        INTERNAL COMBUSTION ENGINE
                         Filed Jan. 29, 1936          2 Sheets-Sheet 2
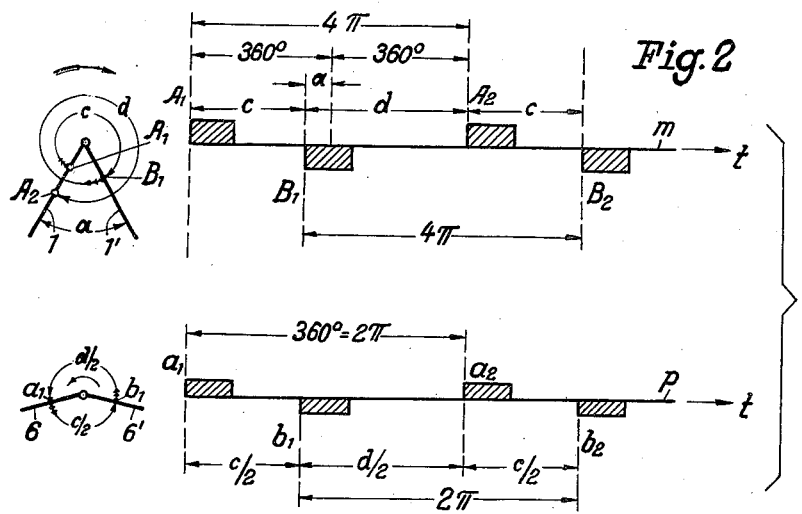
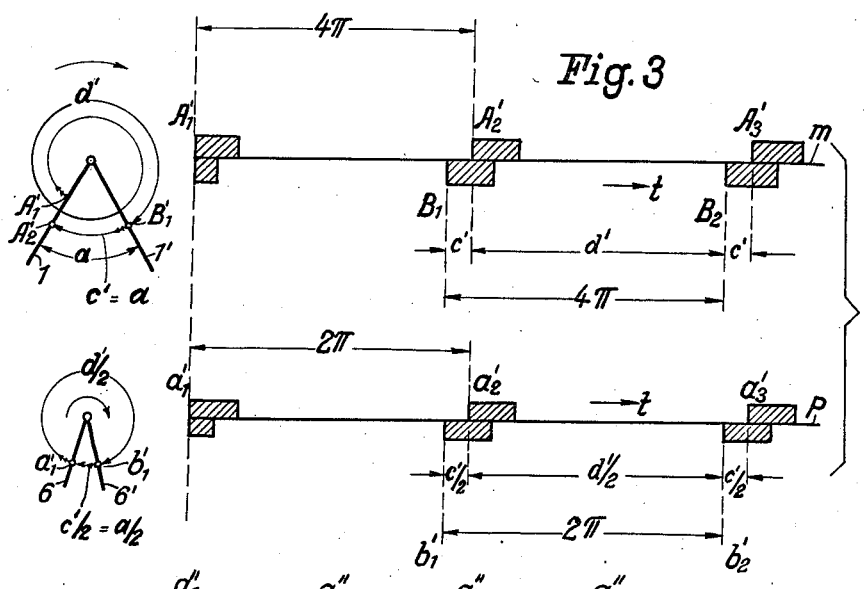
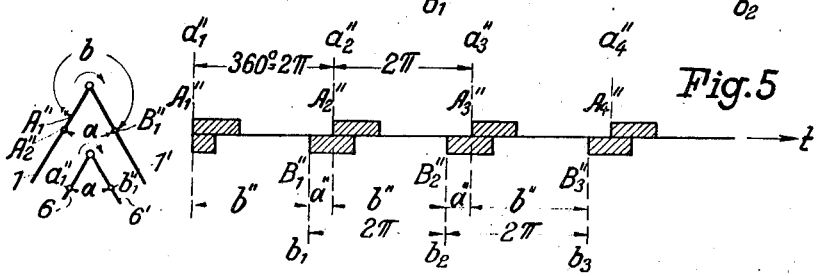
Inventor:
August Lichte Patented Aug. 31, 1937

2,091,370

UNITED STATES PATENT OFFICE 2,091,370

INTERNAL COMBUSTION ENGINE

August Lichte, Dessau-Alten, Germany, assignor to Junkers Flugzeug-und-Motorenwerke Aktiengesellschaft, Dessau, Germany Application January 29, 1936, Serial No. 61,374
In Germany February 9, 1935

13 Claims. (Cl. 123—55)

My invention relates to internal combustion engines, and more particularly to the arrangement of the fuel pumps in engines of the V-type, in which at least one fuel pump is provided for each engine cylinder. Internal combustion engines of the type aforesaid are operated either with ignition by compression (Diesel engines) or with artificial ignition of the fuel-air-mixture produced by injecting the fuel into the air supplied to the engine cylinder (ignition engines). In engines of the injection type the fuel may be injected either into the pipe supplying air to the engine cylinder, or into the engine cylinder itself. Such fuel pumps take up much room, and the pipes connecting the pumps with the engine cylinders or with any pipes leading to them still further increase the space required to accommodate the fuel pumps. Consequently, in particular in the case of engines which, for the reason that only little space is available and the weight of the entire engine shall be kept as low as possible, as is the case e. g., with vehicle engines and quite particularly with air craft engines, the accommodation of the fuel injection pumps frequently encounters considerable difficulties.

It is an object of the present invention to provide for a suitable arrangement of the fuel pumps connected with engines of the V-type, in which at least one pump is provided for each working cylinder.

It is a further object of the invention to so arrange the fuel pumps used in connection with engines of the type aforesaid that the space required to accommodate the engine is increased but as little as possible by the addition of the pumps and that the pumps remain easily accessible for control and repair work.

The invention further strives to provide for a simple mode of driving the fuel pumps, to render the variation of the quantity of fuel conveyed by automatic regulating means as simple as possible, to enable the pipes in which the fuel is conveyed under pressure to the points of injection to be kept as short and straight as possible.

It is a further object of the present invention to arrange the pumps in a manner such as to permit of easy access to all parts, such as injection nozzles, spark plugs and the like, arranged on the working cylinders.

Other objects and the manner in which the same are attained, will appear from the following description.

According to the invention the pumps are arranged in pairs on either side of a central driving shaft and are placed within the wedge-shaped space between the working cylinders of a V-type engine in such a manner, that the shaft driving the pumps extends in the middle plane, and parallel to the crank shaft of the engine. Preferably the cylinders of the pairs of pump cylinders are arranged as well at an angle to each other, i. e., in V-shape, and more particularly so that the angle enclosed by the working cylinders as well as the angle enclosed by the pump cylinders open from the vertex formed by the axis of the crank shaft and the axis of the pump driving shaft, respectively, toward the same side of the engine. In such an arrangement both pumps of a pair of pumps may be driven from the same drive member, such as a cam, crank or the like, provided only that the angle enclosed by the pump cylinders, in the case of two-cycle engines, is equal to the angle enclosed by the axes of the working cylinders. In the case of four-cycle engines, in which the pumps operate with but one half the number of the strokes of the working cylinder, the angle enclosed by the pump cylinders must be but one half of the angle of revolution of the crank shaft between successive firing impulses of the corresponding pair of working cylinders.

In four-cycle engines I prefer the shaft driving the pumps to revolve in a sense counter to that of the crank shaft in case the angles of crank shaft revolution between successive firing impulses exceed or remain below a full revolution (360°) by the angle (angle $a$) enclosed by the diverging axes of the pair of cylinders of the engine. However, if the angles of crank shaft revolution between successive firing impulses are equal to the angle $a$ or equal to 720° minus $a$, the pump driving shaft and the crank shaft of the engine are preferably made to revolve in the same sense. I thereby succeed in placing the working cylinders and the pump cylinders correlated therewith on the same side of the middle plane of the engine, so that the pressure pipe leading from each pump to that point of the working cylinder, where the fuel is injected, need not extend beyond the middle plane of the engine. Consequently, the pressure pipes leading from the pumps to the injection points of the working cylinders are comparatively short and are arranged in a simple and comprehensive manner.

The pumps are preferably mounted on the engine with the aid of a support or the like projecting from the bottom of the wedge-shaped space between the engine cylinders, the middle portion common to the pairs of fuel pumps being secured to this support, preferably in such a manner that a gap remains between the engine cylinders or, with so-called block engines, between the cylinder blocks and the ends of the pump cylinders. Through this gap and through the support, which is preferably apertured or is subdivided into several columns, tools for assembling and dismounting parts, such as injection nozzles, spark plugs and the like, arranged on the engine cylinders on the side of the wedge-shaped space, as well as the parts to be fitted in place or removed may easily be passed.

In the drawings affixed to this specification and forming part thereof two internal combustion engines provided with fuel injection pumps embodying my invention are illustrated diagrammatically by way of example.

In the drawings,

Fig. 1 is a cross section of a four-cycle internal combustion engine of the injection type;

Fig. 2 is a diagram showing the succession of firing impulses in a four-cycle internal combustion engine, operating with a certain angle of crank shaft revolution between successive firing impulses.

Fig. 3 is a similar diagram illustrating operation at a different angle of crank shaft revolution between successive firing impulses.

Fig. 4 is a cross section of a two-cycle engine, and

Fig. 5 is a diagram illustrating the succession of firing impulses in such a two-cycle engine.

Fig. 6 is a horizontal section of a detail of Fig. 1, taken along the lines VI—VI.

Referring to the drawings and first to Fig. 1, the working cylinders 1 and 1' surrounding the pistons 20, 20', are so suspended from the crank case 2, that their axes enclose an acute angle $a$. Nozzles 3, 3' extending through the cylinder wall inject the fuel, preferably during the suction stroke directly into the combustion space 4 or 4' of the working cylinders. The mixture thus formed is ignited after compression by the spark plugs 5 or 5', whereupon the piston in the respective cylinder starts on its working stroke. The pumps 6 and 6' which cooperate with the working cylinders 1 and 1', to compress and convey the liquid fuel are arranged in a common housing 8 in such manner that the pistons 7 and 7' of the two pumps can be driven by the same cam 10 on a common driving shaft 9 of the pump set. This driving shaft 9 is driven, through a step-down gearing, from the crank shaft 12 of the engine to revolve at one half the number of revolutions of the crank shaft. In this manner each working stroke taking place in a working cylinder, or each injection of fuel into that working cylinder, corresponds to a discharge stroke of the correlated single-acting pump.

The axes of the pump cylinders 6 and 6' divide the complete circle having the drive shaft of the pumps as its centre, into two angles each of which is equal to one half of an angle of crank shaft revolution between successive firing impulses of the engine cylinders supplied by these pumps. These angles of crank shaft revolution between successive firing impulses (which, of course, correspond to the angles at which the successive injections take place) differ by the value $2a$, their sum total always amounting to $2.360°=4\pi$. With such arrangement of the pumps injection takes place in either engine cylinder at the same point of the cycle extending over two revolutions.

As to the angles of crank shaft revolution between successive firing impulses, two cases can be distinguished. In one case these angles amount to $c=360°$ minus $a$, and $d=360°$ plus $a$, respectively; in the other case these angles amount to $c=a$ and $d=720°$ minus $a$, respectively.

Fig. 2 shows two corresponding diagrams, the first diagram showing a horizontal axis $m$ on which the time $t$, or the angle of revolution of the crank shaft corresponding to the time $t$, is plotted. The second diagram in Fig. 2 shows an axis $p$ on which the same data are plotted for the driving shaft of the pump. The first diagram starts up, at the point $A_1$, with the beginning of an injection into the working cylinder 1; the next-following injection occurs in the working cylinder 1', at the point $B_1$, after the crank shaft has revolved through the angle $c$. After a further revolution through the angle $d$ the next-following injection takes place in the working cylinder 1, as illustrated at the point $A_2$, while a subsequent injection follows again in the working cylinder 1' at the point $B_2$ after revolution of the crank shaft through the angle $c$, and so on. The sum total of the angles $c+d$ each time amounts to $2.360°$.

Referring now to the second diagram illustrated in Fig. 2, the axes of the pump cylinders 6 and 6', shown in Fig. 1, enclose the angles $$\frac{c}{2} \text{ and } \frac{d}{2},$$

respectively. In this case, in order to obtain synchronism of the discharge of pump 6 with the injection into the working cylinder 1 located on the same side of the middle plane of the engine, when the angles enclosed by the axes of the working cylinders and of the pump cylinders open towards the same side, the driving shaft of the pumps must revolve in a direction counter to that of the crank shaft of the engine. With an arrangement of the pumps as above described, the discharge of the pump 6 at the point $a_1$ is now followed at an angular distance $$\frac{c}{2}$$

by the discharge of the pump 6', indicated at $b_1$, and further, at an angular distance $$\frac{d}{2}$$

the discharge of the pump 6, indicated at $a_2$ etc. As can be guessed from the two diagrams in Fig. 2, there appears a synchronism of the injections into the working cylinder 1, such as indicated at the points $A_1, A_2 \ldots$, with the discharge strokes of the pump 6, such as indicated at the points $a_1, a_2 \ldots$, and also a synchronism of the injections into the working cylinder 1', indicated at the points $B_1, B_2 \ldots$, and the discharge strokes of the pump 6', indicated at the points $b_1, b_2 \ldots$ Fig. 3 shows two diagrams illustrating the second case, in which the angles of crank shaft revolution between successive firing impulses amount to $c'=a$ and $d'=720°$ minus $a$. Thus the injections into the working cylinder 1, indicated at the points $A'_1, A'_2 \ldots$, and into the working cylinder 1', indicated at the points $B'_1, B'_2 \ldots$, follow each other at an angular distance which varies between the angle $c'=a$ and $d'=720°$ minus $a$. The pump cylinders 6 and 6' enclose the angles $$\frac{c'}{2} \text{ and } \frac{d'}{2}$$

respectively. As shown in the two diagrams of

Fig. 3, the discharge strokes of the pump 6, indicated at the points $a'_1, a'_2 \ldots$, occur in synchronism with the injections into the working cylinder 1, and the discharge strokes of the pump 6', indicated at the points $b'_1, b'_2 \ldots$, in synchronism to the injections into the working cylinder 1', provided that the driving shaft of the pumps revolves in the same direction as does the crank shaft of the engine.

Thus in both these cases of the alternative angles of crank shaft revolution between successive firing impulses, the working cylinders and the pump cylinders correlated therewith, are located on the same side of the middle plane I—I, shown in Fig. 1, throughout the entire engine. The pressure pipes 14, shown in Fig. 1, leading from the pumps to the working cylinders, therefore need not cross the middle plane of the engine, but always remain on the same side of that plane, thus extending over but short a distance and being arranged in a simple, clearly visible manner.

As shown e. g., in Figs. 1 and 4, the pumps are mounted with their middle portion 8 on a support 15 projecting between the working cylinders from the crank case 2 in such a manner that between the tops 16 of the working cylinders and the ends 17 of the pump cylinders a clearance is left, through which, as well as through openings 18 of the support 15, which may be subdivided into several columns, there can be inserted and removed, in the direction of the dashed line III, tools for mounting and dismounting parts arranged on the working cylinders such as e. g. the nozzles 3, 3' or else spark plugs and the like, as well as these machine parts themselves.

Fig. 4 illustrates a two-cycle engine, in which the working cylinders 21 and 21' are again suspended from the crank case 22 so that their axes enclose an acute angle $a$. The pumps 26 and 26' of the pair of pumps cooperating with the working cylinders 21 and 21' are driven by one and the same cam 30 of a common cam shaft 29. The pumps 26 and 26' are so arranged that their axes enclose the same angle $a$ as do the working cylinders, and the drive shaft 29 of the pumps rotates in the same sense and with the same number of revolutions as the crank shaft 32 of the engine. For since in a single acting two-cycle engine one injection corresponds to each revolution of the crank shaft, the angular distances of revolution of the crank shaft of the engine and of the drive shaft of the pumps, i. e., for the fuel injection into the working cylinders and for the delivery stroke of the pumps, are equal to each other.

Fig. 5 illustrates diagrammatically the operation of a two-cycle engine according to Fig. 4. In Fig. 5 the beginning of the injection into the working cylinder 1 is indicated at $A''_1$. After an advance about the angle $b$ begins the injection, as indicated at $B''_1$, into the working cylinder 21', after an advance about the angle $a$ begins the injection, as indicated at $B''_2$, into the working cylinder 21' etc. In exactly the same succession and the same angular distances the delivery strokes in the pump cylinders 26, indicated at $a''_1, a''_2 \ldots$, and 26', indicated at $b''_1, b''_2 \ldots$ take place.

In the two-cycle engine illustrated in Figs. 4 and 5, the pressure pipes 34 of the pumps also do not cross the mean plane of the entire engine and can be arranged in the same simple, clearly visible manner as described with reference to the four-cycle engine illustrated in Figs. 1 to 3.

The adaptation of the quantity of fuel, conveyed by each pump during a single delivery stroke, to the output required, in each individual case, from the engine, may be brought about by any of the well known means of controlling the amount of fuel to be conveyed by a fuel pump, such as a variation of stroke, a displacement of stroke in connection with a suction conduit controlled by a piston, or by connecting, in a pump, during a predetermined part of the pressure stroke, the pressure portion with the suction portion. Where the fuel delivery is adjusted by an automatic control device, such as a pressure controlled governor for adapting the amount of fuel to the pressure of the charge of the engine, or a governor, controlled by the number of revolutions, adapted to maintain a predetermined number of revolutions of the crank shaft of the engine, it is preferable to arrange this control device also in the wedge-shaped space between the working cylinders of the engine. In this manner the connections, rods and the like for transmitting the adjustment of the control device onto the pump members to be adjusted, are made as short as possible and are readily accessible, simple and clearly visible.

Fig. 6 is a horizontal section through the pump arrangement according to Fig. 1, illustrating a governor arranged in the wedge-shaped space between the working cylinders of a V-type engine. The driving shaft 9 of the pumps is arranged for axial displacement in the casing 8' and is provided with cams 10'. The cams 10' are shaped in such a manner that the strokes of the pistons 7' of the pumps are varied according to the adjustment of the shaft 9, thus supplying more or less fuel to the engine cylinders. The shaft 9 is connected with a separate shaft portion 49, which cannot be moved axially, through a coupling which consists of a disk 50 provided with studs and a disk 51 provided with holes, the studs fitting into the holes in a manner such that an axial displacement of the coupling portions is rendered possible. The shaft portion 49 is driven, by means of a bevel gearing 52, 53, from a shaft 54 which through a further gearing (not shown) is connected with the crank shaft 12 shown in Fig. 1. The displacement of shaft 9 is effected by a centrifugal governor consisting of balls 55 revolving between a plane 56 and a hollow cone 57. The cone 57 is permanently pressed, by a spring 58, against the balls 55.

The operation of the governor shown in Fig. 6 is as follows:

When the engine runs too fast, the balls 55 move towards the outside, causing the hollow cone 57 to be moved towards the left-hand side of Fig. 6. The cams 10' act onto the pistons 7' of the pumps with a lower portion, thus decreasing the strokes of the pistons and reducing the amount of fuel supplied to the engine. When the number of revolutions of the engine is reduced, the tension of the spring 58 exceeds the centrifugal force of the balls 55, moving the shaft 9 again towards the right-hand side, so that a higher portion of cams 10' acts on the pistons, increasing their stroke and the amount of fuel supplied to the engine.

Numerous advantages appear from the novel combination of the set of fuel pumps with a V-type internal combustion engine. The space taken up by the engine as a whole is but little increased by the novel arrangement of the pumps according to my invention. Such pumps are readily accessible for the purpose of control or repair, the length of piping leading from the pumps to the working cylinders being considerably reduced and simple and clearly visible. The novel pumps do not hinder the access to machine parts fixed to the working cylinders. Furthermore the drive of the pumps as well as the control of the quantity of fuel to be conveyed by means of an automatic control device is rendered simple and economical.

Various changes may be made in the details disclosed in the foregoing specification without departing from the invention or sacrificing the advantages thereof.

I claim:—

1. In an internal combustion engine in combination, a pair of working cylinders arranged with their axes at an angle of less than 180° to each other, a pair of fuel pumps arranged in the angular space between said working cylinders, each cylinder being associated with a separate pump and means for driving each pump individually in predetermined relation to the cycle of action of the cylinder associated with that pump.

2. In an internal combustion engine in combination, a pair of working cylinders arranged with their axes at an angle of less than 180° to each other, a pair of fuel pumps arranged in the angular space between said working cylinders with their axes extending also at an angle to each other, each cylinder being associated with a separate pump and means for driving each pump individually in predetermined relation to the cycle of action of the cylinder associated with that pump.

3. In an internal combustion engine in combination, a pair of working cylinders arranged with their axes at an acute angle to each other, a pair of fuel pumps arranged in the angular space between said working cylinders each cylinder being associated with a separate pump and means for driving each pump individually in predetermined relation to the cycle of action of the cylinder associated with that pump.

4. In an internal combustion engine in combination, a pair of working cylinders arranged with their axes at an acute angle to each other and a pair of fuel pumps associated with and arranged in the angular space between said working cylinders with their axes extending also at an acute angle to each other.

5. In an internal combustion engine in combination, a pair of working cylinders arranged with their axes at an angle of less than 180° to each other and a pair of fuel pumps associated with and arranged in the angular space between said working cylinders with their axes extending also at an angle to each other, an engine driving shaft associated with said working cylinders and a pump driving shaft extending in parallel to said engine driving shaft.

6. In an internal combustion engine in combination, a pair of working cylinders arranged with their axes at an angle of less than 180° to each other and a pair of fuel pumps associated with and arranged in the angular space between said working cylinders with their axes extending also at an angle to each other, an engine driving shaft associated with said working cylinders and a pump driving shaft extending in parallel to said engine driving shaft, said shafts being arranged in the points of intersection of the middle axes of said working cylinders and of said pumps, respectively.

7. In an internal combustion engine in combination, a pair of working cylinders arranged with their axes at an angle of less than 180° to each other and a pair of fuel pumps associated with and arranged in the angular space between said working cylinders with their axes extending also at an angle to each other, both angles opening towards the same side.

8. In an internal combustion engine in combination, a pair of working cylinders arranged with their axes at an angle of less than 180° to each other and a pair of fuel pumps associated with and arranged in the angular space between said working cylinders with their axes extending also at an angle to each other, an engine driving shaft associated with said working cylinders and a pump driving shaft extending in parallel to said engine driving shaft and arranged to actuate both pumps.

9. In a four-cycle internal combustion engine in combination, a pair of working cylinders arranged with their axes at an angle of less than 180° to each other and a pair of fuel pumps associated with and arranged in the angular space between said working cylinders with their axes extending also at an angle to each other, an engine driving shaft associated with said working cylinders and a pump driving shaft extending in parallel to said engine driving shaft, said pumps being arranged to be operated with one half of the number of strokes occurring per unit of time in said working cylinders, the angle enclosed by the pumps of said pair of pumps being one half of the smaller angle of revolution of said engine driving shaft between successive firing impulses of the pair of engine cylinders associated with said pair of pumps.

10. In an internal combustion engine in combination, a pair of working cylinders arranged with their axes at an angle of less than 180° to each other, a support extending half way into the angular space between said cylinders and a pair of fuel pumps mounted on said support in said angular space and associated with said engine cylinders.

11. In an internal combustion engine in combination, a pair of working cylinders arranged with their axes at an angle of less than 180° to each other, an apertured support extending half way into the angular space between said cylinders and a pair of fuel pumps mounted on said support in said angular space and associated with said engine cylinders.

12. In an internal combustion engine in combination, a pair of working cylinders arranged with their axes at an angle of less than 180° to each other and a pair of fuel pumps and an automatically active fuel delivery regulating mechanism associated with and arranged in the angular space between said working cylinders.

13. In an internal combustion engine in combination, a pair of working cylinders arranged with their axes at an angle of less than 180°, a pair of fuel pumps associated with and arranged in the angular space between said working cylinders with their axes extending also at an angle to each other, an engine driving shaft associated with said working cylinders, a pump driving shaft extending in parallel to said engine driving shaft and a single actuating means on said pump driving shaft arranged to actuate both said pumps.

AUGUST LICHTE.